United States Patent
Probin et al.

(10) Patent No.: US 10,139,891 B2
(45) Date of Patent: Nov. 27, 2018

(54) SYSTEMS AND METHODS OF POWER-SAFE CONTROL PANEL INSTALLATION

(71) Applicant: Honeywell International Inc., Morristown, NJ (US)

(72) Inventors: Robert John Probin, Glasgow (GB); Craig Fleming, East Kilbride (GB); Yvette Miller, Motherwell (GB); Stuart Bryan Ball, Motherwell (GB); James S. McDevitt, Glasgow (GB); Leslie Steell, East Kilbride (GB)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 69 days.

(21) Appl. No.: 14/747,236

(22) Filed: Jun. 23, 2015

(65) Prior Publication Data

US 2016/0378167 A1 Dec. 29, 2016

(51) Int. Cl.
*G06F 1/32* (2006.01)

(52) U.S. Cl.
CPC .......... *G06F 1/3287* (2013.01); *Y02D 10/171* (2018.01)

(58) Field of Classification Search
CPC ...... G06F 1/3203; G06F 3/0482; G06F 3/017; G06F 1/263
See application file for complete search history.

(56) References Cited

U.S. PATENT DOCUMENTS

| | | | | |
|---|---|---|---|---|
| 4,698,748 A * | 10/1987 | Juzswik | ................ | G06F 1/3215 455/343.2 |
| 6,072,169 A * | 6/2000 | Kang | ................ | F24C 15/2042 126/273 A |
| 6,093,922 A * | 7/2000 | Kim | ................ | F24C 15/2042 126/21 A |
| 7,425,946 B1 | 9/2008 | Britton | | |
| 2008/0316024 A1* | 12/2008 | Chantelou | ................ | G08B 25/10 340/539.17 |
| 2015/0021993 A1 | 1/2015 | Smith et al. | | |
| 2015/0036164 A1* | 2/2015 | Song | ................ | H04N 1/00896 358/1.13 |
| 2016/0135263 A1* | 5/2016 | Chen | ................ | F21K 9/60 315/200 R |
| 2016/0141865 A1* | 5/2016 | Drake | ................ | H02H 7/0822 318/445 |

FOREIGN PATENT DOCUMENTS

WO    WO 2013/019659 A1    2/2013

OTHER PUBLICATIONS

Extended European search report from EP patent application 16173419.9, dated Nov. 23, 2016.

* cited by examiner

*Primary Examiner* — Austin Hicks
*Assistant Examiner* — Alyaa T Mazyad
(74) *Attorney, Agent, or Firm* — Husch Blackwell LLP

(57) ABSTRACT

Systems and methods of power-safe control panel installation are provided. Some systems can include a control panel that includes a programmable processor and executable control software stored on a non-transitory computer readable medium, wherein the programmable processor and the executable control software can transmit a signal to selectively remove power from at least one portion of the control panel.

16 Claims, 1 Drawing Sheet

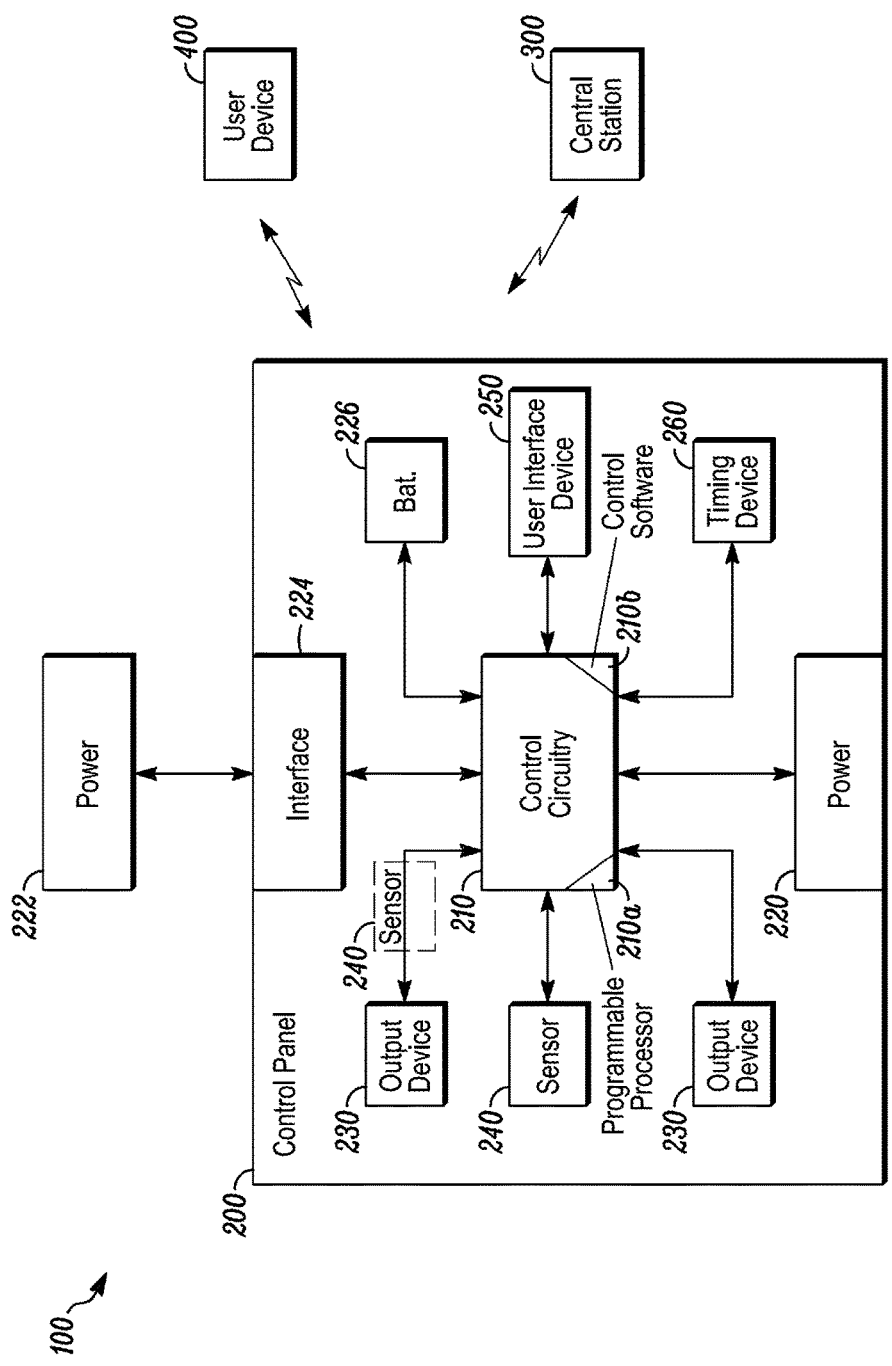

SYSTEMS AND METHODS OF POWER-SAFE CONTROL PANEL INSTALLATION

FIELD

The present invention relates generally to control panels in a security system. More particularly, the present invention relates to a system and method of power-safe control panel installation.

BACKGROUND

Known security systems can monitor for unauthorized intruders and burglars in a secured area or and/or can monitor access to a secured location. Known security systems include at least one control panel, and in known systems and methods, a user must disconnect power to the control panel in order to work on components or wiring of the control panel. Indeed, in known systems and methods, the microprocessor and associated software on the control board of the control panel must be unpowered during installation of the control panel and the maintenance thereof.

One known solution to disconnect power to the control panel includes removing the main power feed (AC or DC) as well as the system back-up battery connectors, which are typically one or two lead-acid batteries. However, this solution presents various disadvantages and problems. First, the control panel can be located in an inaccessible location. Second, remote power supplies can add to the complexity of the power disconnection process. Third, systems that use self-actuating bells with internal batteries can ring when power from the control panel is removed. Finally, when batteries are left disconnected, there can be a delay before the system notifies a user, which can lead to lost time when an installer or other person responsible for maintenance must return to the site of the control panel for reconnecting the battery. Accordingly, manually removing power from the control panel is not preferred.

Another known solution to disconnect power to the control panel includes providing a switch in the main control unit, for example, on the control board, which, when actuated, can disconnect both the incoming main power supply and the backup batteries. However, this solution also presents various disadvantages and problems. First, such a switch may need to be shrouded to satisfy UL standards and avoid accidental power removals. Second, use of such a switch prevents the system from automatically recovering after a power disconnect. Third, use of such a switch prevents the system from notifying a remote alarm center that the power disconnect is occurring. Fourth, on systems with two batteries, any such switch must include three poles to support both the incoming power and the two backup batteries, which adds extra cost. Fifth, such a switch does not address remote power supply units that power sections of the system. Sixth, such a switch does not address self-actuating bells that ring when power is disconnected. Seventh, inclusion of such a switch increases the complexity of PCB track wiring with respect to power routing and electromagnetic capability while also increasing the size of the PCB, which adds extra cost. Finally, not all customers desire such a switch, which leads to extra build options, extra sales complexity, and extra stocking of different units. Accordingly, a manually operated switch to disconnect power from the control panel is also not desirable.

Another known solution to disconnect power to the control panel includes hot-swapping devices, which includes adding and removing devices and peripherals from a live system. Hot-swap bus wiring can potentially solve some of the issues identified above, but many users do not want to face the potential risks presented. For example, hot-swapping devices can damage the overall system, can cause local user interface devices to sound due to missing communications, and can cause local self-actuating sirens to sound or have problems caused by large batteries supplying a massive amount of current and causing a spark upon connection. Furthermore, although most equipment is wired directly rather than via polarized connectors with lower power and ground connections, like a USB connection, thereby minimizing the risk of equipment damage with the use of RS485 drivers and other protection devices, the risk of damage is not obsolete. Accordingly, hot-swapping devices to disconnect power from the control panel is not preferred.

Notwithstanding the above, most installation and maintenance work on a control panel is performed outside of the control panel box. Accordingly, some problems caused by power to the control panel or the lack thereof are not issues at all times.

In view of the above, there is a continuing, ongoing need for an improved system and method of power-safe control panel installation.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of power-safe control panel installation. For example, in some embodiments, the system and method disclosed herein can provide a signal to a control system to make power on the control panel safe for the user to work on the control panel as a whole or on parts thereof. Indeed, the control panel can be made power-safe by removing power on or to the system wiring, terminal blocks, or other system outputs. In some embodiments, system outputs and power connections to incoming power and/or batteries can be selectively removed and restored.

Some embodiments disclosed herein can include active and executable control software stored on a transitory or non-transitory computer readable medium, including, but not limited to, local computer memory, RAM, optical storage media, magnetic storage media, flash memory, and the like. It is to be understood that the systems disclosed and described above and herein can included such active and executable control software and that the methods disclosed above and herein can be executed and/or controlled by such active and executable control software.

In some embodiments, systems and methods disclosed herein can log maintenance data, can allow rapid and user-controller power on and power down cycling to test sections of a control panel, thereby reducing installation and maintenance times, and/or can control remote communication systems, a remote server, and/or cloud-based functionality. Furthermore, in some embodiments, systems and methods disclosed herein can update firmware and configuration software and/or data in the background of the system while the control panel is being installed or maintenance on the control panel is being performed.

In some embodiments, some power outputs, such as those connected to self-actuating bells, can be selectively not isolated from power removal. Accordingly, even when power is removed from the control panel or parts thereof, power can still be supplied to such power outputs to prevent activation thereof. Additionally or alternatively, in some embodiments, some power outputs can be isolated from supplied power via an alternative method.

Some embodiments disclosed herein can include a system and method for returning power to the control panel, for example, reapplying the main incoming power to the control panel, after a power disconnect. For example, some embodiments can include a timer that is pre-set by a manufacturer or configured based on user input received before or during the power-safe installation. In these embodiments, systems and methods disclosed herein can monitor the timer and, upon expiration thereof, can return power to the control panel. In some embodiments, systems and methods disclosed herein can also provide a warning indication a predetermined period of time prior to the expiration of the timer. Accordingly, a user can either finish the installation and/or maintenance of the control panel prior to the expiration of the timer or reset the timer, either locally or remotely, so that the user has more time to complete the installation and/or maintenance of the control panel prior to the power return.

Additionally or alternatively, some embodiments can include one or more sensors that, upon detection of a predetermined condition, transmit a signal to cause the return of power to the control panel. For example, a sensor or tamper switch can detect when a lid or door of the control panel cabinet is closed and, upon such detection, transmit a signal to cause the return of power to the control panel.

Additionally or alternatively, some systems and methods for returning power to the control panel can include a restart button that can be actuated by a user to return power to the control panel.

In some embodiments, the control panel can include one or more sensors, for example, a power output current detector, that can monitor one or more pieces of wiring on the control panel. When the sensor or current detector identifies a problem or fault on a piece or portion of wiring, the sensor or current detector can transmit a signal to abort restoring power to at least that wiring. In some embodiments, the sensor or current detector can also cause a user to be notified about the problem or fault substantially immediately.

In some embodiments, power removal from and/or power restoration to the control panel or parts thereof can be controlled via a webpage or software application on a user's computer, smart phone, or tablet. Indeed, in some embodiments, systems and methods disclosed herein can remotely activate and/or control software on the control panel, thereby allowing a user to remotely and selectively control power to different parts of the control panel.

In addition to removing output power from the control panel as described above, some systems and methods disclosed herein can safely shut down some or all control software of the control panel, including, a main control unit and remote power supplies. Furthermore, some systems and methods disclosed herein can isolate power to a selected portion of the control panel, for example, a control board of the panel.

In some embodiments, a notification regarding the removal and restoration of power as described above and herein can be transmitted to a monitoring center remote from the premises at which the control panel is located. In some embodiments, such a notification can be transmitted prior to, concurrently with, or substantially after such power removal and restoration.

It is to be understood that the power removal and restoration described above applies equally to the main control board and/or power supply of a control panel and to remote power supplies.

FIG. 1 is a block diagram of a system 100 in accordance with disclosed embodiments. As seen in FIG. 1, the system 100 can include a control panel 200 that can include a control board that includes, for example, control circuitry 210, one or more programmable processors 210a, and executable control software 210b as would be understood by one of ordinary skill in the art. The executable control software can be stored on a transitory or non-transitory computer readable medium, including, but not limited to, local computer memory, RAM, optical storage media, magnetic storage media, flash memory, and the like. In some embodiments, the control software 210b can execute and control the methods for power removal and restoration as described above and herein.

The control circuitry 210 can receive power from a main power supply 220, which can be hard wired to an electrical system in a building in which the control panel 200 is located. Additionally or alternatively, the control circuitry 210 can receive power from one or more remote power supplies 222 via an interface 224 on the control panel 200. Additionally or alternatively, the control circuitry 210 can receive power from one or more back up batteries 226 local to the control panel 200.

As seen in FIG. 1, the control panel 200 can also include one or more power output devices 230, one or more sensors 240, a user interface device 250, and a timing device 260. The control circuitry 210 can supply power to each of the power output devices 230, the sensors 240, the user interface device 250, and the timing device 260 via wiring and/or buses that connect the respective devices to the control circuitry 210.

In some embodiments, the control panel 200 can be in wired or wireless communication with a central station 300 in a region remote from the region in which the control panel 200 is located. In some embodiments, the control panel 200 can be in wired or wireless communication with a user device 400, such as a computer, tablet, or smart phone. As described above, the user device 400 can execute a software application or access a webpage via which a user can remotely control the control panel 200.

In accordance with disclosed embodiments, the control circuitry 210 and/or at least some of the wiring and/or buses connecting the devices of the control panel 200 can include one or more relays or electronic switches, for example, a MOSFET, that can be controlled by the control circuitry 210, the programmable processor 210a, and/or the control software 210b to make power on the control panel 200 safe for a user to work on the control panel 200 as a whole or on parts thereof. For example, in some embodiments, the control circuitry 210, the programmable processor 210a, and/or the control software 210b can control the relays and electronic switches to remove or isolate power from the power output devices 230. In some embodiments, the control circuitry 210, the programmable processor 210a, and/or the control software 210b can control the relays and electronic switches to remove or isolate power from the control circuitry 210, the programmable processor 210a, and/or the control software 210b, for example, by isolating power provided by one or more of the main power supply 220, the remote power supply 222, and the backup battery 226.

As explained above, wiring and/or buses can connect the respective devices of the control panel 200 to the control circuitry 210. To isolate the wiring and/or buses from power, the control circuitry 210, programmable processor 210a, and/or control software 210b can selectively control power output on the various pieces of wiring and/or buses. In some embodiments, the devices of the control panel 200 can be connected to buses, for example, power buses, via transceivers, and in these embodiments, the control circuitry 210, programmable processor 210a, and/or control software 210b can selectively disable the transceivers or a receive mode thereof to remove power and voltage from the bus and devices connected thereto.

It is to be understood that the main power supply 220, the remote power supply 222, and the backup battery 226 can be controlled independently as needed. For example, the control circuitry 210, programmable processors 210a, and/or control software 210b can selectively isolate power from one or more of the main power supply 220, the remote power supply 222, and the backup battery 226. Accordingly, the entire control panel 200 or parts thereof powered by a selected power supply can be made power-safe for installation and/or maintenance of the control panel 200 or parts thereof. Furthermore, in some embodiments, the source of power for devices of the control panel 200 can be selectively changed according to the power isolation and disconnect methods as disclosed herein.

As explained above, the timing device 260 can monitor the time period of power disconnect, removal, or isolation and transmit a signal to the control circuitry 210 upon expiration of a predetermined time period for notification to a user and/or for power restoration.

The user interface device 250 can include one or more user input mechanisms, such as a switch, button, or keypad, and one or more user output mechanisms, such as an audio or visual transducer, one or more LEDs, and a display screen. The user interface device 250 can receive user input regarding power removal and/or power restoration, and the user interface device 250 can transmit such user input to the control circuitry 210 for executing methods in accordance with the user input.

For example, in some embodiments, a user input mechanism of the user interface device 250 can include a push button switch. When depressed a first time, the user interface device 250 can transmit a signal to the control circuitry 210, and responsive thereto, the control circuitry 210, programmable processors 210a, and/or control software 210b can remove supplied to the power output devices 230. Similarly, when depressed two times, the user interface device 250 can transmit a signal to the control circuitry 210, and responsive thereto, the control circuitry 210, programmable processors 210a, and/or control software 210b can isolate power supplied from the remote power supply 222 and the backup battery 226. When depressed three times, the user interface device 250 can transmit a signal to the control circuitry 210, and responsive thereto, the control circuitry 210, programmable processors 210a, and/or control software 210b can disconnect power supplied to the control software 210b. When depressed four times, the user interface device 250 can transmit a signal to the control circuitry 210, and responsive thereto, the control circuitry 210, programmable processors 210a, and/or control software 210b can isolate power supplied from the main power supply 220. In some embodiments, the status or mode of the power on the control panel 200 can be displayed to a user via a user output mechanism of the user interface device 250.

Additionally or alternatively, in some embodiments, the user input mechanism of the user interface device 250 can include a keypad for receiving user input to select the status or mode of the power on the control panel 200. Additionally or alternatively, in some embodiments, a user can provide user input via the user device 400, which responsive thereto, can transmit a signal, directly or via a webpage, to the control circuitry 210. Indeed, in any embodiment, some or all of the power on the control panel 200 can be selectively removed, disconnected, or isolated with or without disconnecting power supplied to the control software 210b to shut down the control software 210b.

In some embodiments, some or all of the user interface device 250 can be shielded with a cover and/or can be located within a tamper protected box, for example, with a screw lid or with a lid with a lock. Additionally or alternatively, in some embodiments, some or all of the user interface device 250 can be disabled until a predetermined condition is met or a predetermined event occurs. In some embodiments, the predetermined event can include the control panel 200 or the control circuitry 210 being placed in an engineering mode, for example, by a user entering an appropriate PIN code at the user input mechanism or a second user authenticating the engineering mode. In some embodiments, the user interface device 250 can be enabled for a predetermined period of time until the predetermined condition is met a second time or until the predetermined event occurs a second time.

The sensors 240 seen in FIG. 1 can monitor conditions of the control panel 200 prior to and during power disconnection and/or power restoration. For example, when all or portions of the control panel 200 are disconnected from power as disclosed herein, the sensors 240 can transmit a signal indicating that the power disconnection is desired, thereby suppressing an alarm that may otherwise occur during a power loss. Additionally or alternatively, when all or portions of the control panel 200 are restored with power, the sensors 240 can suppress an alarm that may otherwise occur when new devices are added to the system 100.

As explained above, in some embodiments, the sensors 240 can detect one or more predetermined conditions. Upon such detection, the sensors 240 can transmit a signal to the control circuitry 210, and responsive thereto, the control circuitry 210, the programmable processors 210a, and the control software 210b can execute power restoration methods as described above.

Additionally or alternatively, in some embodiments, the sensors 240 can monitor the wiring and/or buses connecting the devices of the control panel 200. Upon detection of a problem or fault on a piece or portion of wiring or on a bus, a sensor 240 can transmit a signal to the control circuitry 210, and responsive thereto, the control circuitry 210, the programmable processors 210a, and the control software 210b can execute power disconnection methods as described above for at least that portion of the wiring or bus.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a main power supply;
a backup power supply;
a user input device;
a sensor; and
a control panel coupled to the main power supply and the backup power supply that includes control circuitry, a programmable processor, and executable control software stored on a non-transitory computer readable medium,
wherein, responsive to the user input device receiving a first user input, the programmable processor and the executable control software, transmit a first signal to isolate the control circuitry from power provided by the main power supply,
wherein, responsive to the user input device receiving a second user input different from the first user input, the programmable processor and the executable control software, transmit a second signal to isolate the control circuitry from the power provided by the main power supply and the backup power supply to make the control panel safe for work,
wherein the sensor monitors the control panel and transmits a third signal indicating that power disconnection is desired when the sensor detects all or a portion of the control panel being disconnected from the main power supply responsive to the first user input or being disconnected from both the main power supply and the backup power supply responsive to the second user input, and
wherein the third signal prevents activation of a power loss alarm.

2. The system of claim 1 wherein the programmable processor and the executable control software transmit a fourth signal to restore the power provided by the main power supply and the backup power supply to the control circuitry.

3. The system of claim 2 further comprising a timing device, wherein, upon expiration of a predetermined period of time monitored by the timing device, the programmable processor and the executable control software transmit the fourth signal to restore the power provided by the main power supply and the backup power supply to the control circuitry.

4. The system of claim 2 wherein, upon the sensor detecting a predetermined condition, the programmable processor and the executable control software transmit the fourth signal to restore the power provided by the main power supply and the backup power supply to the control circuitry.

5. The system of claim 2 wherein the user interface device receives a third user input to instruct the programmable processor and the executable control software to transmit the fourth signal.

6. The system of claim 1 wherein isolating the control circuitry from the power provided by the main power supply and the backup power supply includes selectively terminating the executable control software.

7. The system of claim 1 wherein, upon the sensor detecting a predetermined condition, the programmable processor and the executable control software transmit the first signal.

8. The system as in claim 7 wherein the sensor monitors one or more pieces of wiring or a power bus.

9. The system of claim 1 wherein the user interface device communicates receipt of the first user input and the second user input to the control panel using a webpage.

10. The system of claim 1 further comprising at least one relay or at least one electronic switch, wherein the programmable processor and the executable control software control the at least one relay or the at least one electronic switch to isolate the control circuitry from the power provided by the main power supply and the backup power supply.

11. A method comprising:
receiving a first user input via a user interface device;
responsive to the first user input, transmitting a first signal to isolate control circuits of a control panel from power provided to the control circuits by a main power supply of the control panel;
receiving a second user input different from the first user input via the user interface device;
responsive to the second user input, transmitting a second signal to isolate the control circuits from the power provided to the control circuits by the main power supply and a backup power supply of the control panel to make the control panel safe for work; and
responsive to a sensor monitoring the control panel and detecting all or a portion of the control panel being disconnected from the main power supply responsive to the first user input or being disconnected from both the main power supply and the backup power supply responsive to the second user input, transmitting a third signal indicative of power disconnection being desired, wherein the third signal prevents activation of a power loss alarm.

12. The method of claim 11 further comprising, responsive to a predetermined event or a predetermined condition, transmitting a fourth signal to restore the power provided by the main power supply and the backup power supply to the control circuits.

13. The method of claim 12 further comprising the sensor or a timing device detecting the predetermined event or the predetermined condition.

14. The method of claim 11 wherein transmitting the first signal to isolate the control circuits from the power includes removing the power from at least one power output, at least a portion of wiring, or at least a portion of a power bus.

15. The method of claim 11 wherein transmitting the first signal includes controlling at least one relay or at least one electronic switch to isolate the control circuits from the power.

16. The system of claim 11 wherein the user interface device communicates receipt of the first user input and the second user input to the control panel using a webpage.

* * * * *